(12) United States Patent
Hurwitz et al.

(10) Patent No.: US 6,217,733 B1
(45) Date of Patent: Apr. 17, 2001

(54) BIPOLAR MEMBRANE AND METHOD FOR FABRICATING SUCH BIPOLAR MEMBRANE

(75) Inventors: Heinz Hurwitz, Rhode-Saint-Genese; Rachid El Moussaoui, Brussels, both of (BE)

(73) Assignees: Solvay (Societe Anonyme), Brussels (BE); Electricite de France, Paris (FR)

( * ) Notice: Subject to any disclaimer, the term of this patent is extended or adjusted under 35 U.S.C. 154(b) by 0 days.

(21) Appl. No.: 08/765,998

(22) PCT Filed: Jul. 4, 1995

(86) PCT No.: PCT/BE95/00064

§ 371 Date: May 5, 1997

§ 102(e) Date: May 5, 1997

(87) PCT Pub. No.: WO96/01286

PCT Pub. Date: Jan. 18, 1996

(30) Foreign Application Priority Data

Jul. 5, 1994 (BE) .................................................. 9400630

(51) Int. Cl.[7] .................................................. B01D 35/06
(52) U.S. Cl. .................. 204/631; 204/632; 204/633; 204/537; 204/538; 204/295; 205/344; 205/510; 205/511; 205/512
(58) Field of Search .................... 205/344, 510, 205/511, 512; 204/631, 632, 633, 537, 538, 295

(56) References Cited

U.S. PATENT DOCUMENTS 5,380,413 * 1/1995 Posar et al. ........................... 204/537

FOREIGN PATENT DOCUMENTS

0600470A3 * 6/1994 (EP) .
2122543 * 1/1984 (GB) .
WO 89/01059 * 2/1989 (WO) .
WO 94/19399 * 9/1994 (WO) .

OTHER PUBLICATIONS

Simmons R., A Novel Method For Preparing Bipolar Membranes, Electrochimica Acta, vol. 31, No. 9, pp. 1175–1176, (1986), No month available.*

* cited by examiner

Primary Examiner—Bruce F. Bell
(74) Attorney, Agent, or Firm—Knobbe, Martens, Olson, Bear, LLP

(57) ABSTRACT

A bipolar membrane, usable for electrodialysis of aqueous electrolytes, comprises two ion exchange membranes, respectively anionic and cationic, juxtaposed along a common surface, wherein, along said common surface, a gel based on hydrated metal sulpate and/or sulphite, including less than 0.01 mol % of indium, cerium, manganese and copper sulphates gel, is formed.

15 Claims, No Drawings

BIPOLAR MEMBRANE AND METHOD FOR FABRICATING SUCH BIPOLAR MEMBRANE

This application is a 371 of PCT/BE95/00064 filed Jul. 4, 1995.

The invention relates to a bipolar membrane which can be used for the electrodialysis of aqueous electrolytes.

Bipolar membranes are constituent components of electrodialysis cells. The latter are well known in the art, where they are used, in particular, for the manufacture of acids and bases from their salts. In these electrodialysis methods, the bipolar membranes are immersed in aqueous electrolytes, and they are the seat of a dissociation of water under the action of an electric field. An effort is generally made to reduce the voltage needed for the dissociation of water in the bipolar membrane.

In methods generally used to manufacture bipolar membranes, a cationic ion exchange membrane and an anionic ion exchange membrane which have previously undergone a conditioning are juxtaposed. To this end, in British Patent Application 2122543, a description is given of bipolar membranes obtained by juxtaposing a cationic ion exchange membrane and an anionic ion exchange membrane which have undergone a conditioning treatment such that they possess, along their contiguous common surface, an internal zone containing metal cations and anions selected, in particular, from tetraborate, metaborate, silicate, metasilicate, tungsten, chlorate, phosphate, sulfate, chromate, hydroxyl, carbonate, molybdate, chloroplatinate, chloropaladate, orthovanadate and tellurate anions. For the conditioning treatment, treatment of the ion exchange membranes with aqueous solutions of indium sulfate, sodium sulfate, cerium sulfate, copper sulfate, manganese sulfate, chromium chloride, ruthenium chloride and rhodium chloride may be mentioned specifically. In International Application WO 89/01059, a method is described for manufacturing a bipolar membrane, according to which a cationic ion exchange membrane and an anionic ion exchange membrane are treated separately with an alkaline solution of a salt of a metal other than sodium or potassium, the two ion exchange membranes are thereafter juxtaposed and the assembly thereby obtained is then treated with an alkaline aqueous solution. In this known method, the alkaline solution used is sodium hydroxide solution and the metal salt is generally a metal chloride. Ceric sulfate may be mentioned.

The bipolar membranes obtained by means of the known methods described above are generally characterized by a good mechanical cohesion, a moderate electrical resistance and a moderate voltage for the dissociation of water.

The objective of the invention is to provide bipolar membranes having improved performances relative to those of the membranes obtained by means of the known methods described above, especially bipolar membranes affording a low voltage of dissociation of water.

Consequently, the invention relates to a bipolar membrane which can be used for the electrodialysis of aqueous electrolytes, comprising two ion exchange membranes, anionic and cationic respectively, which are juxtaposed along a common surface, the bipolar membrane being characterized in that it comprises, along the abovementioned common surface, a gel based on hydrated metal sulfate and/or sulfite, excluding indium, cerium, manganese and copper sulfate gels.

The bipolar membrane according to the invention comprises an anionic ion exchange membrane and a cationic ion exchange membrane. Anionic ion exchange membrane is understood to denote a thin, nonporous sheet selectively permeable to anions and impermeable to cations. A cationic ion exchange membrane is a thin, nonporous sheet selectively permeable to cations and impermeable to anions. Hereinafter, the anionic ion exchange membrane will be designated anionic membrane and the cationic ion exchange membrane will be called cationic membrane. In the bipolar membrane according to the invention, the ion exchange membranes must be made of a material which is inert with respect to acidic or basic aqueous solutions. Cationic membranes which can be used in the bipolar membrane according to the invention are, for example, sheets made of fluorinated polymer containing functional groups derived from sulfonic acids, from carboxylic acids or from phosphonic acids, or mixtures of such functional groups, these groups playing the part of fixed cationic sites of the membrane. Cationic membranes of this type which can be used in the bipolar membrane according to the invention are those known under the name RAIPORE (PALL RAI) and under the brand name MORGANE (SOLVAY), especially the membranes RAIPORE R-4010, MORGANE CDS and MORGANE CRA. Anionic membranes which can be used in the bipolar membrane according to the invention consist of sheets made of a polymeric material which is inert with respect to acidic or basic aqueous solutions and which comprises quaternary ammonium groups playing the part of fixed anionic sites. Anionic membranes which can be used in the bipolar membrane according to the invention are the membranes RAIPORE R-1030, RAIPORE R-4030 and MORGANE ADP.

The thickness of the ion exchange membranes will affect the mechanical and electrochemical properties of the bipolar membrane according to the invention. The optimum thickness of the ion exchange membranes will be the outcome of a compromise between sufficient mechanical strength (property favored by large thicknesses) and a low transverse electrical resistance (property favored by small thicknesses). In practice, the thickness of the ion exchange membranes is generally greater than 10 $\mu$m, and preferably at least equal to 20 $\mu$m. It is generally less than 250 $\mu$m and rarely exceeds 200 $\mu$m, the most suitable thicknesses generally being from 30 to 150 $\mu$m.

In the bipolar membrane according to the invention, the anionic membrane and the cationic membrane are juxtaposed so that they are in contact with one another substantially over the entire area of a common surface. According to the invention, the bipolar membrane comprises, along this common surface, a gel based on hydrated metal sulfate and/or sulfite. The expression "metal sulfate and/or sulfite" denotes any metal salt derived from sulfuric acid or sulfurous acid. The expression "gel based on hydrated metal sulfate and/or sulfite" means that the gel is formed from metal sulfate and/or sulfite, and that it can comprise anions other than sulfate anions and sulfite anions, for example, in general, hydroxyl anions. In the bipolar membrane according to the invention, the gel constitutes a hydrophilic and electroconductive medium along the common junction surface of the two ion exchange membranes. While not wishing to be bound by a theoretical explanation, the inventors think that this gel promotes the dissociation of water molecules when the bipolar membrane is used in the electrodialysis methods defined above. The gel must consequently be in contact with the two ion exchange membranes along at least a portion of the abovementioned common junction surface, this portion generally representing at least 25 (preferably at least 50) % of said common junction surface. It may be located entirely in only one of the two ion exchange membranes to the exclusion of the other, or alternatively overlap the abovementioned common surface and belong simultaneously to both ion exchange membranes. Preferably, the gel is located at least partially (for example in the proportion of at least 50%) in the anionic ion exchange membrane. In practice, the gel extends over only a portion of the thickness of the or of each ion exchange membrane, said portion representing, for example, a few percent of the total thickness of said ion exchange membrane. The properties of the bipolar membrane according to the invention will depend on the quality of the gel, and especially on its water absorption capacity and its electrical conductivity. Indium sulfate, cerium sulfate, manganese sulfate and copper sulfate gels are excluded from the invention. This expression is understood to mean that the gel based on hydrated metal sulfate and/or sulfite may possibly contain indium sulfate gel, cerium sulfate gel, manganese sulfate gel or copper sulfate gel, but in the trace state in which they do not exert a substantial influence on the voltage of dissociation of water in the bipolar membrane, everything else remaining equal. In practice, the gel based on hydrated metal sulfate and/or sulfite of the bipolar membrane according to the invention must contain less than 0.01 mol % of indium, cerium, manganese or copper sulfate gel. It is preferably free from these gels.

In the bipolar membrane according to the invention, the metal sulfate and/or sulfite may comprise a single metal or several different metals.

In a preferred embodiment of the bipolar membrane according to the invention, the metal sulfate and/or sulfite is metal monosulfate and/or monosulfite [of general formulae $M(SO_4)n/2$ and $M(SO_3)n/2$, respectively, where M denotes a metal and n denotes the valency of the metal M], as opposed, in particular, to the metal hydrogensulfates, hydrogensulfites, pyrosulfates and pyrosulfites. In this embodiment of the invention, the gel may be based on metal monosulfate or based on metal monosulfite. As a variant, it may comprise a mixture of metal monosulfate and monosulfite. It is preferable for the gel to be essentially based on metal monosulfate.

In another preferred embodiment of the bipolar membrane according to the invention, the metal sulfate and/or sulfite of the gel comprises sulfate and/or sulfite of a multivalent metal, preferably chromium sulfate and/or sulfite. The sulfate and sulfite of trivalent chromium $CR^{3+}$ have proved especially advantageous. According to a recommended variant of this embodiment of the invention, the gel comprises a mixture of trivalent chromium sulfate and/or sulfite and alkaline-earth metal (preferably magnesium or calcium) sulfate and/or sulfite. In this variant of the invention, the alkaline-earth metal sulfate and/or sulfite is present in a less abundant molar amount than the trivalent chromium sulfate and/or sulfite, generally in a molar amount at least equal to 0.001% (preferably to 0.01%) but less than 10% (preferably less than 5%) in molar terms of the amount of trivalent chromium sulfate and/or sulfite [sic]. In this variant of the invention, trivalent chromium monosulfate and mixtures of trivalent chromium monosulfate and alkaline-earth metal monosulfate are preferred.

The invention also relates to a method for manufacturing a bipolar membrane according to the invention, as defined above, according to which two ion exchange membranes, anionic and cationic respectively, are employed, at least one of the ion exchange membranes is treated with metal cations and the two ion exchange membranes are then juxtaposed along a common junction surface, the treatment of the ion exchange membrane with metal cations comprising the formation of a gel based on hydrated metal sulfate and/or sulfite along at least a portion of the abovementioned common junction surface, excluding indium, cerium, manganese and copper sulfate gels.

In the method according to the invention, the ion exchange membranes employed have been defined above and the metal cations are cations of metals which have been defined above with reference to the bipolar membrane according to the invention.

In the method according to the invention, the gel based on hydrated metal sulfate and/or sulfite may be obtained by any suitable known means. An especially recommended means consists in first forming a precipitate of metal sulfate and/or sulfite, which is then converted to hydrated gel.

To this end, according to a first embodiment of the method according to the invention, the ion exchange membrane is treated successively with an aqueous solution comprising the abovementioned metal cations and with an aqueous solution comprising sulfate and/or sulfite anions, so as to obtain the precipitate of metal sulfate and/or sulfite, and the precipitate is then subjected to a maturation in the aqueous solution of sulfate and/or sulfite anions. In this embodiment of the invention, the metal cations must be selected from those which form insoluble compounds with sulfate and/or sulfite anions, as in the case of some compounds with $Cr^{3+}$ cations, and they are employed in the state of water-soluble salts. Inorganic water-soluble salts are preferred, especially hydrated metal salts such as, for example, chlorides and nitrates. Nitrates are very suitable and, among these, chromic nitrate is especially recommended. Hydrated chromic nitrate is advantageously used, chromic nitrate nonahydrate being preferred. Indium, cerium, manganese and copper are excluded from the invention. This expression is understood to mean that indium, cerium, manganese or copper cations may possibly be employed, but in sufficiently small amounts for the indium, cerium, manganese or copper sulfate and/or sulfite gel which might become formed to be only in the trace state in the hydrated metal sulfate and/or sulfite gel, according to the definition given above. The concentration of the aqueous solution of metal cations is not critical, concentrated solutions being, however, preferred. In practice, it is recommended that aqueous solutions in which the concentration of metal cations is at least equal to 0.1 (preferably to 0.5) mol/l are used. The maximum permissible concentration of the aqueous solution of metal cations is that which corresponds to saturation, and it consequently depends on various parameters, in particular on the metal cations selected, on the water-soluble compound employed to supply the metal cations and on the temperature of the solution. It is preferable to employ the solution at a temperature in the region of room temperature, for example from 15 to 35° C. The aqueous solution of sulfate and/or sulfite anions can be a sulfuric or sulfurous acid solution or a solution of water-soluble metal sulfate and/or sulfite. It is preferable to employ an aqueous solution of metal sulfate or sulfite, preferably of alkali metal sulfate or sulfite, sodium sulfate and sodium sulfite being especially advantageous. The concentration of the aqueous solution of sulfate and/or sulfite anions is not critical, concentrated solutions being, however, preferred. In practice, it is recommended that aqueous solutions in which the concentration of sulfate and/or sulfite anions is at least equal to 0.1 (preferably to 0.5) mol/l are used. The maximum permissible concentration of the aqueous solution of sulfate and/or sulfite anions is that which corresponds to saturation, and it consequently depends on various parameters, in particular on the compound employed to supply the sulfate and/or sulfite anions and on the temperature of the solution. It is preferable to use a saturated solution or a solution close to saturation at the temperature of treatment of the anionic membrane. The treatment of the ion exchange membrane with the aqueous solution of sulfate and/or sulfite anions is performed at a temperature at least equal to, and preferably above, room temperature, temperatures at least equal to 50° C. being recommended. In principle, the maximum permissible temperature for the treatment with the aqueous solution of sulfate and/or sulfite anions is defined by the boiling point of the solution and by the need to avoid a thermal deterioration of the properties of the treated membrane. In practice, the best results are obtained at temperatures of 65 to 85° C. The treatment of the ion exchange membrane with the aqueous solution of sulfate and/or sulfite anions is followed by a maturation treatment of this membrane in the aqueous solution of sulfate and/or sulfite anions.

The ion exchange membrane which is treated with the aqueous solution of metal cations and with the aqueous solution of sulfate and/or sulfite anions may equally well be the cationic membrane or the anionic membrane. It is preferable for both ion exchange membranes to be treated with these two solutions. In the case where only one of the two ion exchange membranes is treated with those two solutions, it is preferable for it to be the anionic membrane. The function of the successive treatments of the or of each ion exchange membrane with the solution of metal cations and with the solution of sulfate and/or sulfite anions and the subsequent maturation treatment is to form a layer of water-insoluble metal sulfate along at least one side of the treated ion exchange membrane. The respective amounts of the two solutions are consequently interdependent and depend on various parameters, especially on the metal cations selected (in particular their valency) and on the respective concentrations of the two solutions, and they may be readily determined in each particular case by a routine laboratory analysis. In practice, it is advantageous to employ an excess of sulfate and/or sulfite anions relative to the theoretic amount needed for forming the metal sulfate and/or sulfite. The function of the maturation treatment is to effect the precipitation of the metal sulfate and/or sulfite and the formation of the gel. It is generally carried out at a temperature above room temperature, for example from 65 to 90° C., for a time longer than one hour, generally at least equal to 3 hours. In principle, there is no upper limit to the duration of the maturation treatment; in practice, for considerations of an economic nature, it is generally less than 100 hours and rarely exceeds 50 hours.

In this first embodiment of the method according to the invention, the successive treatments of the ion exchange membrane with the aqueous solution of metal cations and then the aqueous solution of sulfate and/or sulfite anions may, for example, be carried out by immersing the membrane in a bath of the solution, or by spraying the latter in the atomized state onto one side of the ion exchange membrane.

The maturation treatment may be followed by a washing of the ion exchange membrane. It is, however, preferable according to the invention expressly to avoid treating the ion exchange membrane with pure water after it has been treated with the solution of metal cations and/or with the solution of sulfate and/or sulfite anions.

After the treatment with the aqueous solution of sulfate and/or sulfite anions, the two ion exchange membranes are juxtaposed against one another. The two ion exchange membranes are preferably juxtaposed in the wet state, taking care to avoid the formation of air pockets between them. To juxtapose the two ion exchange membranes, it generally suffices to apply them against one another without pressure. As a variant, it is possible to apply the two membranes under pressure, but this is not desirable. The juxtaposition of the two ion exchange membranes may be performed at room temperature or at high temperature, provided the latter remains below the temperature of thermal degradation of the anionic membrane or of the cationic membrane.

In a variant of implementation of the abovementioned first embodiment of the method according to the invention, which is especially advantageous, the formation of the hydrated gel of metal sulfate and/or sulfite is carried out, after the two ion exchange membranes have been juxtaposed, by electrochemical dissociation of water along the common junction surface of the two ion exchange membranes. In this advantageous variant of implementation of the invention, the conversion of the metal sulfate and/or sulfite to gel may be performed later, at the time of use of the bipolar membrane in a method of electrodialysis of aqueous electrolytes.

In another variant of implementation of the abovementioned first embodiment of the method according to the invention, the solution of metal cations is an aqueous solution of trivalent chromium containing alkaline-earth metal cations in the trace state. In this variant of implementation of the method according to the invention, the amount of trivalent chromium in the aqueous solution of metal cations is advantageously at least equal to 50 (preferably 80) mol % of the amount corresponding to saturation at room temperature. Trace of alkaline-earth metal cations is understood to denote an amount not exceeding 10 mol percent of chromium cations. The alkaline-earth metal cations are preferably in an amount at least equal to 0.5 (preferably to 1) mol per 100 mol of chromium cations, values from 1 to 2 mol per 100 mol of chromium cations being especially recommended. Everything else being equal, the bipolar membranes obtained by means of this variant of implementation of the method according to the invention afford a minimum voltage of dissociation of water. The alkaline-earth metal is preferably calcium or magnesium, magnesium having proved to be especially advantageous.

According to a second embodiment of the method according to the invention, the ion exchange membrane is treated with a single solution containing the metal cations and sulfate and/or sulfite anions, and the membrane is subjected to a maturation in said solution. The working conditions regarding the treatment of the ion exchange membrane with the solution of metal cations and of sulfate and/or sulfite anions and the maturation treatment are similar to those stated above with reference to the first embodiment of the method according to the invention.

The bipolar membrane collected at the end of the method according to the invention should preferably be stored in the wet state before it is used in an electrodialysis cell.

The bipolar membrane according to the invention is very suitable for the electrochemical decomposition of water, and it may consequently be used in electrodialysis techniques employing aqueous solutions. It thus finds a use in the manufacture of acids and bases from their salts. It finds an especially advantageous application for the manufacture of aqueous solutions of alkali metal hydroxide (especially sodium hydroxide) by electrodialysis of aqueous solutions of alkali metal salts such as alkali metal chloride, carbonate or sulfate.

Consequently the invention also relates to a method for manufacturing an aqueous solution of alkali metal hydroxide by electrodialysis of an aqueous solution of an alkali metal salt, according to which the electrodialysis is performed in the presence of a bipolar membrane according to the invention, as defined above.

The invention applies especially to the manufacture of aqueous solutions of sodium hydroxide by electrodialysis of aqueous solutions of sodium chloride, for example by means of the technique described in U.S. Pat. No. 4,238,305.

The examples which follow serve to illustrate the invention.

EXAMPLE 1

Reference Example, Not According to the Invention

A bipolar membrane was manufactured from a cationic membrane MORGANE CDS and an anionic membrane MORGANE ADP. To this end, an aqueous solution containing 20% by weight of chromic nitrate nonahydrate and calcium in an approximate amount equal to 0.2 mol per 100 mol of chromium ions was employed. The two ion exchange membranes were immersed in this solution at 25° C. for 20 hours. The two membranes were then withdrawn from the solution and thereafter immersed immediately in an aqueous solution containing 10% by weight of sodium hydroxide at 70° C. for approximately 18 hours. After the treatment in the sodium hydroxide solution, the cationic membrane and the anionic membrane were applied against one another in the wet state under a pressure of approximately 78 MPa at room temperature.

To evaluate how the bipolar membrane thereby obtained performed, the latter was arranged vertically in a laboratory measuring cell between an anode and a cathode made of silver. The bipolar membrane was arranged in the electrodialysis cell in such a way that its anionic side was facing the anode, its cationic side facing the cathode. Two chambers were thus delimited in the cell, which was filled with aqueous sodium chloride solution (0.1 mol/l). A regulated voltage was applied between the anode and the cathode so as to produce an electrodialysis current density of 100 mA per $cm^2$ of surface of the bipolar membrane, and the potential difference between the two sides of the bipolar membrane was measured by means of Luggin capillaries. This potential difference stabilized at a value in the region of 1.4 V.

EXAMPLE 2

According to the Invention

The experiment of Example 1 was repeated, substituting aqueous sodium sulfate ($Na_2SO_4$) solution (2 mol/l of solution) at 80° C. for the aqueous sodium hydroxide solution. The potential difference between the two sides of the bipolar membrane was measured in the manner and under the conditions described in Example 1. This potential difference stabilized at approximately 1.0 V.

EXAMPLE 3

According to the Invention

The collective working conditions of Example 2 were repeated, the only difference being that, after the treatment with sodium sulfate solution, both ion exchange membranes were subjected to a wash with demineralized water. Moreover, the juxtaposition of the two membranes was performed under a pressure of 78 MPa at 150° C. The potential difference between the two sides of the bipolar membrane stabilized at approximately 1.0 V.

EXAMPLE 4

According to the Invention

The experiment of Example 2 was repeated, the only difference being that, to juxtapose the two ion exchange membranes, they were applied against one another without exerting pressure. The measured potential difference stabilized at 1.0 V.

EXAMPLE 5

According to the Invention

The experiment of Example 4 was repeated, the following modifications being made thereto:
 the solution of chromic nitrate nonahydrate [sic] used was free from calcium;
 the concentration of the aqueous sodium sulfate solution was 1 mol of sodium sulfate per liter of solution;
 the temperature of the aqueous sodium sulfate solution was equal to 85° C.

The potential difference of the bipolar membrane obtained was measured in the manner described in Example 1: 0.9 V

EXAMPLE 6

According to the Invention

The experiment of Example 5 was repeated, the following modifications being made thereto:
 aqueous sodium sulfite ($Na_2SO_3$) solution (concentration: 1 mol of sodium sulfite per liter of solution) was substituted for the sodium sulfate solution;
 the temperature of the sodium sulfite solution was maintained at 80° C.

The bipolar membrane showed a potential difference equal to 1.3 V.

EXAMPLE 7

According to the Invention

To aqueous sodium sulfate solution (1 mol of sodium sulfate per liter of solution), chromium nitrate nonohydrate [sic] was added in an amount equivalent to 50 g of this compound per 100 $cm^3$ of the resulting solution.

A cationic membrane MORGANE CDS and an anionic membrane MORGANE ADP were immersed in the solution thereby obtained, maintained at 85° C. for 24 hours. The two membranes were then withdrawn from the solution and applied against one another in the wet state without exerting pressure.

To evaluate how the bipolar membrane thereby obtained performed, it was subjected to the electrodialysis experiment described in Example 1. The potential difference between the two sides of the bipolar membrane stabilized at 1.2 V.

EXAMPLE 8

Not According to the Invention

The experiment of Example 1 was repeated using a cationic membrane RAIPORE R-4010 and an anionic membrane RAIPORE R-1030. In this example, the juxtaposing of the two ion exchange membranes was performed without exerting pressure. The potential difference between the two sides of the bipolar membrane, measured in the manner and under the conditions described in Example 1, stabilized at approximately 1.3 V.

EXAMPLE 9

According to the Invention

The experiment of Example 8 was repeated, substituting aqueous sodium sulfate ($Na_2SO_4$) solution under the conditions of Example 2 for the aqueous sodium hydroxide solution. The potential difference between the two sides of the bipolar membrane was measured in the manner and under the conditions described in Example 1. This potential difference stabilized at approximately 0.8 V.

A comparison of the results of Examples 2, 3, 4, 5, 6, 7 and 9 (according to the invention) with those of Examples 1 and 8 (not according to the invention) shows the progress contributed by the invention. These examples show that the bipolar membrane according to the invention is characterized by an advantageous potential difference on the order of 1.0 V. The bipolar membranes of the state of the art have a potential difference of about 1.3–1.4 V.

We claim:

1. A bipolar membrane which can be used for the electrodialysis of aqueous electrolytes, comprising two ion exchange membranes, anionic and cationic respectively, which are juxtaposed along a common surface, characterized in that said bipolar membrane further comprises, along said common surface, a gel based on hydrated metal sulfate and/or sulfite but containing less than 0.01 mol % of indium, cerium, manganese or copper sulfate gel.

2. A bipolar membrane according to claim 1, wherein the metal sulfate and/or sulfite is at least either hydrated metal monosulfate and/or monosulfite.

3. A bipolar membrane according to claim 2, wherein the gel is based on hydrated metal monosulfate.

4. A bipolar membrane according to claim 1, wherein said hydrated gel is located at least partially in the anionic ion exchange membrane.

5. A bipolar membrane according to claim 1, wherein the metal sulfate and/or sulfite comprises chromium sulfate and/or sulfite.

6. A method for manufacturing a bipolar membrane of claim 1, wherein two ion exchange membranes, anionic and cationic respectively, are employed, said method comprising the steps of treating at least one of the ion exchange membranes with metal cations, and juxtaposing the two ion exchange membranes along a common junction surface, wherein the treatment of the ion exchange membrane with metal cations comprises the formation of a gel based on hydrated metal sulfate and/or sulfite along at least a portion of the abovementioned common junction surface, containing less than 0.01 mol % of indium, cerium, manganese and copper sulfate gel.

7. A method according to claim 6, wherein, to form the gel, a precipitate of metal sulfate and/or sulfite is formed first, and is then converted to the hydrated gel.

8. A method according to claim 7, wherein, to convert the precipitate to the hydrated gel, electrochemical dissociation of water is effected along the abovementioned common junction surface after the two ion exchange membranes have been juxtaposed.

9. A method according to claim 7, wherein, to form the precipitate, the ion exchange membrane is treated successively with an aqueous solution comprising the metal cations and with an aqueous solution comprising sulfate and/or sulfite anions, and the precipitate is then subjected to maturation in the aqueous solution of sulfate and/or sulfite anions.

10. A method according to claim 9, wherein the solution of metal cations is an aqueous solution of nonahydrated trivalent chromium nitrate.

11. A method according to claim 9, wherein the aqueous solution of metal cations comprises trivalent chromium cations and alkaline-earth metal cations in an amount from 1 to 2 mol per 100 mol of chromium cations.

12. A method according to claim 9, wherein the ion exchange membrane which is treated with the aqueous solution of metal cations and with the aqueous solution of sulfate and/or sulfite anions is the anionic membrane.

13. A method according to claim 9, wherein the anionic ion exchange membrane and the cationic ion exchange membrane are treated with the solution of metal cations and with the solution of sulfate and/or sulfite anions.

14. A method according to claim 7, wherein to form the precipitate, the ion exchange membrane is treated with an aqueous solution comprising the metal cations and sulfate and/or sulfite anions, and the precipitate is then subjected to maturation in said aqueous solution.

15. A method for manufacturing an aqueous solution of alkali metal hydroxide, comprising performing electrodialysis of an aqueous solution of an alkali metal salt, using a bipolar membrane of claim 1.

* * * * *